June 30, 1964  R. A. VAN PATTEN  3,138,835
MOLDING (MOLD)

Filed Aug. 24, 1962  2 Sheets-Sheet 1

ROYAL A. VAN PATTEN
*INVENTOR.*

BY John R. Faulkner
Thomas H. Oster
ATTORNEYS

June 30, 1964 R. A. VAN PATTEN 3,138,835
MOLDING (MOLD)
Filed Aug. 24, 1962 2 Sheets-Sheet 2

ROYAL A. VAN PATTEN
*INVENTOR.*

BY John C. Faulkner
Thomas H. Oster
ATTORNEYS

United States Patent Office 3,138,835
Patented June 30, 1964

3,138,835
MOLDING (MOLD)
Royal A. Van Patten, Dearborn, Mich., assignor to Ford Motor Company, Dearborn, Mich., a corporation of Delaware
Filed Aug. 24, 1962, Ser. No. 220,937
10 Claims. (Cl. 22—131)

This invention pertains to molds and more particularly to a mold having a core that is accurately and consistently positioned, resulting in cast walls of accurate and uniform dimensions.

This application is a continuation in part of my co-pending application Serial No. 846,380, filed October 14, 1959, now abandoned which, in turn, is a continuation in part of Serial No. 678,175, filed August 14, 1957, now abandoned.

In the past it has been difficult with known techniques to cast a hollow object with consistent accuracy. This difficulty is particularly acute when a tubular supporting member is desired since any variation in wall thickness from a desired uniform thickness will result in a weak spot in the structure of said member. With the device of this invention a core is so accurately placed that parts heretofore considered necessary to forge may be cast. One of such parts is an engine connecting rod for which a mold embodying this invention will later be described in detail.

A feature of this invention resides in the provision of a sectional mold with the central member of the mold having supports disposed between upper and lower flanges and a core carried by the supports. Side mold sections are then placed between the upper and lower flanges of the central member of the mold until they abut the supports of the central member of the mold or each other, thereby providing an accurate fit. The flanges become additionally effective as molding and positioning means if they are slightly wedge shaped. With this construction it is relatively easy to form a mold providing for accurate placement of a core.

It is, therefore, an object of my invention to provide a sectional mold having a central member and cooperating side mold sections.

Another object is to provide a core supporting, mold closing member adapted to form with cooperating side mold sections an accurately defined cavity for casting suitable objects and particularly those objects wherein a portion thereof is of a hollow nature.

A further object is to provide a central member which accurately supports a core with respect to side mold sections, forming between the core and side mold sections a cavity of accurate and consistent dimension for the reception of molten metal to cast suitable objects.

A still further object is to provide a mold in which a hollow shank connecting rod may be inexpensively and accurately cast.

Further objects and advantages of this invention will become more apparent when the following representative embodiment is considered in connection with the accompanying drawings, wherein.

Figure 1:
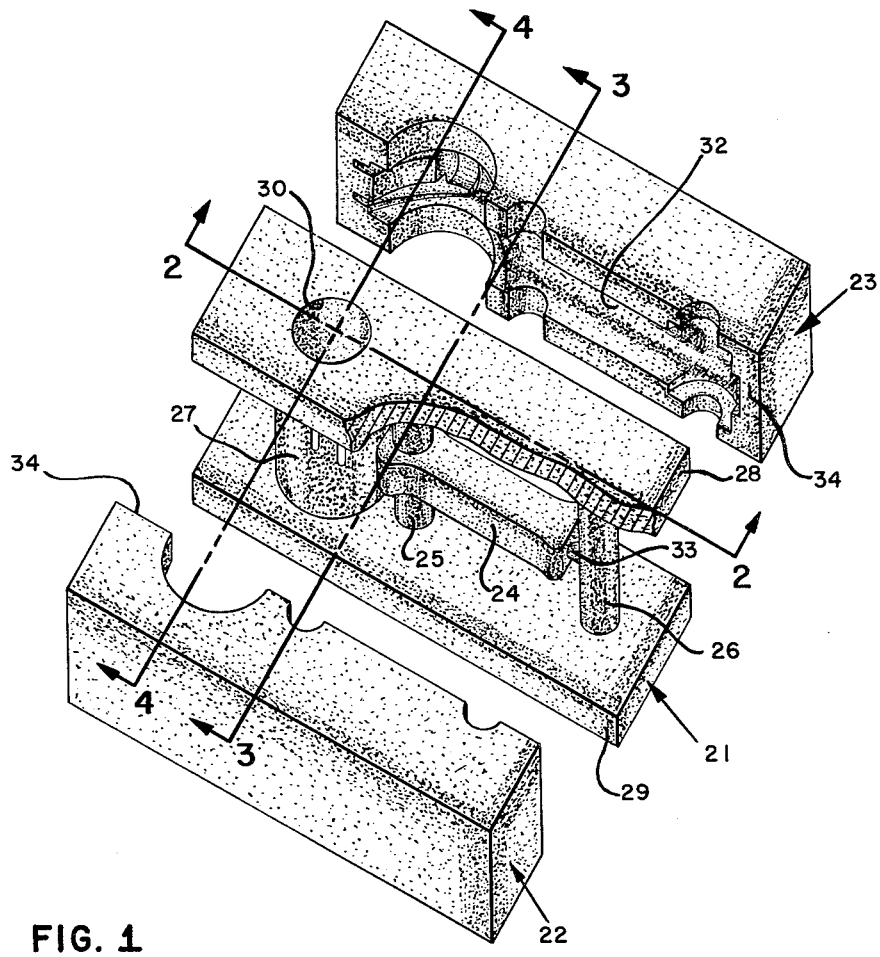
FIGURE 1 is an exploded view of a connecting rod mold.
Figure 2:
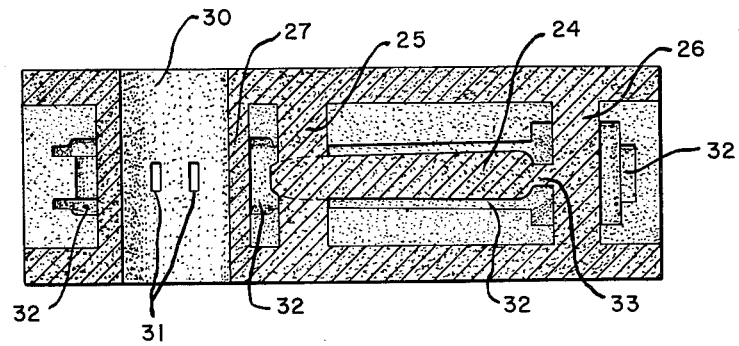
FIGURE 2 is a sectional view taken at 2—2 of FIGURE 1 showing the core and its supports and the mold cavity.
Figure 4:
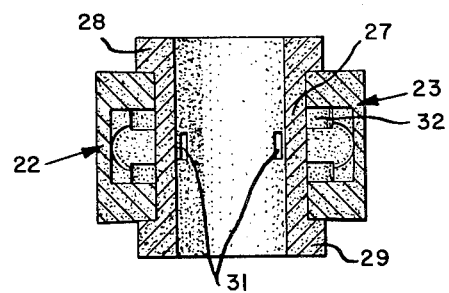
FIGURE 4 is a sectional view taken at 4—4 of FIGURE 1 showing the large journal form of the connecting rod.

In FIGURE 1 is seen the central member 21 of the mold which has upper and lower outwardly extending flanges 28 and 29. Side mold sections 22 and 23 are placed in abutment with each other between flanges 28 and 29. In FIGURE 2, which is a section through the center of the central member 21 of the mold, is seen a horizontal core 24 held in place and supported by a vertical core 25 and a linking core 33, the link being connected with the vertical core 26 which serves to form the bore of the small journal of the connecting rod and as a support for core 24 and linking core 33. Between core 24 and side mold sections 22 and 23 is formed the mold cavity 32 for forming the shank which connects the small and large journals of the connecting rod. The large journal is formed in the mold cavity between the cylindrical portion of a vertical core 27 and side mold sections 22 and 23, shown best in FIGURE 4, while the small journal is formed in the mold cavity 32 between vertical core 26 and side mold sections 22 and 23. Vertical core 25 in addition to serving as a core support for horizontally positioned core 24 also serves to form openings in opposing sides of the hollow shank of the connecting rod. Such openings reduce or eliminate the changes for explosive action within the hollow shaft upon penetration into the hollow interior by a liquid or gas. In a similar but different embodiment, an additional vertical core is positioned between linking core 33 and vertical core 26. In such embodiment the additional vertical core serves to support linking core 33, forms additional openings in the hollow shank similar to those formed by vertical core 25, and eliminates the opening between the hollow of the shank and the bore of the small journal of the rod which is formed by linking core 33 in the embodiment shown. Side mold sections 22 and 23 are in abutment along parting plane 34 as shown in FIGURE 1.

Figure 3:
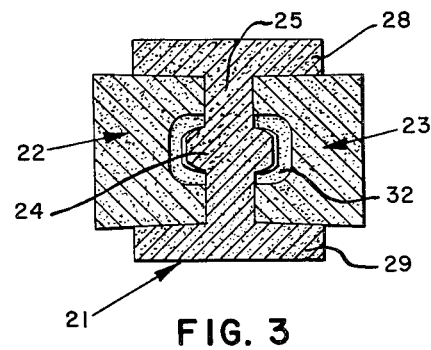
FIGURE 3 is a sectional view taken at 3—3 of FIGURE 1 showing the core support and core which are an integral part of the central member of the mold with two symmetrical and opposed mold sections.

FIGURE 3 shows the relationship between the side mold sections 22 and 23 and the central member 21 of the mold, depicting how these sections, when inserted between the upper and lower supporting flanges 28 and 29 of the central member 21 of the mold, form about core 24 a mold cavity 32 of accurate dimensions for the connecting rod shank. The wedge configuration of side mold sections 22 and 23 and of flanges 28 and 29 aid in securely molding and accurately placing the side mold sections 22 and 23 with respect to the central member 21 of the mold.

Ferritic nodular iron may be poured into opening 30 which has inlets 31 to the mold cavity 32 to produce a suitable engine connecting rod. As an aid to production, the molds of this invention may be stacked in tiers to decrease the pouring time. Before placing side mold sections 22 and 23 into molding position with central member 21, the surfaces to be brought into abutment are treated with suitable adhesives in accordance with methods known to the art. These units are then brought into abutting position thereby closing the mold. After the adhesive has dried or set, the units are tightly bound together, forming a self-supporting mold. However, it is within the scope of this invention to employ other conventional binding means for holding the aforementioned side mold sections in position with respect to the central member and to each other during casting or to merely position the mold within a covering device for purposes of safety.

It will be understood that the invention is not to be limited to the exact construction shown and described, but that various changes and modifications may be made without departing from the spirit and scope of the invention, as defined in the appended claims.

What is claimed is:

1. A sectional mold comprising a central member and side sections insertable therein to a predetermined depth; said central member comprising a core, a core support supporting said core in fixed relationship to said core support, and a pair of flanges spaced apart by and supporting said core support in fixed relationship to said flanges; said side sections being shaped to admit of insertion between said flanges to said predetermined depth with each of said side sections in abutting relationship with each side section adjacent thereto; said side sections and said central member completing a mold cavity for the reception of molten material about said core when said side sections are in said abutting relationship and are inserted to said predetermined depth between said flanges.

2. A sectional mold comprising a central member and side sections insertable therein; said central member comprising a core, a core support supporting said core in fixed relationship to said core support, and a pair of flanges spaced apart by and supporting said core support in fixed relationship to said flanges; said central member having positioning means situated thereon which are constructed and arranged to arrest insertion of said side members between said flanges at a predetermined depth; said side sections being constructed and arranged to be inserted between said flanges to said predetermined depth with each of said side sections in abutting relationship with each side section adjacent thereto; said side sections and said central member completing a mold cavity for the reception of molten material about said core when said side sections are in said abutting relationship and are inserted to said predetermined depth between said flanges.

3. A sectional mold comprising a central member and side sections insertable therein; said central member comprising a core, a core support supporting said core in fixed relationship to said core support, and a pair of flanges spaced apart by and supporting said core support in fixed relationship to said flanges; said side sections being constructed and arranged to be inserted between said flanges with each of said side sections in abutting relationship with each side section adjacent thereto; each of said side sections having positioning means situated thereon which are constructed and arranged to arrest insertion of said side sections between said flanges when said insertion has reached a predetermined depth; said side sections and said central member completing a mold cavity for the reception of molten material about said core when said side sections are in said abutting relationship and are inserted to said predetermined depth between said flanges.

4. A sectional mold comprising a central member and side sections insertable therein; said central member comprising a core, a core support carrying said core in fixed relationship to said core support, and a pair of flanges spaced apart by and supporting said core support in fixed relationship to said flanges; said side sections being constructed and arranged to be inserted between said flanges with each of said side sections in abutting relationship with each side section adjacent thereto; said side sections and said core completing a mold cavity for the reception of molten material when said side sections are in said abutting relationship between said flanges and at least two of said side sections oppositely disposed in relation to said core support abut opposite sides of said core support and each other.

5. A three-piece mold for casting hollow shank connecting rods including a central member having a pair of substantially parallel flanges disposed the length of said rod to be cast, said central member integrally including core supports disposed between said flanges, a core integrally carried by said supports intermediate said flanges, a pair of side mold sections disposed between said flanges and abutting each other along the length of the connecting rod to be cast, said side mold sections having cooperative portions disposed against and within said flanges and defining with said core a cavity defining the shank of the rod, said central member also defining an opening in communication with said cavity through which the molten metal may be poured.

6. A three-piece mold for casting hollow shank connecting rods including a central member having a pair of substantially parallel flanges disposed the length of said rod to be cast, said central member integrally including a core support disposed between said flanges and also integrally including a core supporting link integrally formed with a vertical core disposed between said flanges, a core integrally carried by said support and link intermediate said flanges, a pair of side mold sections disposed between said flanges and abutting each other along the length of the connecting rod to be cast, said side mold sections having cooperative portions disposed against and within said flanges and defining with said core integrally carried by said support and link a cavity defining the shank of the rod, said central member also defining an opening in communication with said cavity through which the molten metal may be poured.

7. A three-piece mold for casting hollow shank connecting rods including a central member having a pair of substantially parallel flanges disposed the length of said rod to be cast, said central member integrally including core supporting links integrally formed with vertical cores disposed between said flanges, a core integrally carried by said links intermediate said flanges, a pair of side mold sections disposed between said flanges and abutting each other along the length of the connecting rod to be cast, said sections having cooperative portions disposed against and within said flanges and defining with said core integrally carried by said links a cavity defining the shank of the rod, said central member also defining an opening in communication with said cavity through which the molten metal may be poured.

8. A three-piece mold for casting a hollow shank part comprising a central member having a pair of substantially parallel flanges disposed along the length of said part to be cast, a core support integrally formed with said central member and disposed between said flanges, a core integrally carried by said core support intermediate said flanges, a pair of side mold sections positioned between said flanges and abutting each other along the length of the part to be cast, said side mold sections having cooperative portions positioned against and intermediate said flanges, said cooperative portions and said core defining a cavity for said part to be cast, said central member also defining an opening in communication with said cavity through which the molten metal may be poured.

9. A three-piece mold for casting a hollow shank part comprising a central member having a pair of substantially parallel flanges disposed along the length of said part to be cast, a core support and a first core integrally formed with said central member and disposed between said flanges, a core supporting link integrally formed with said first core and disposed between said flanges, a second core integrally carried by said core support and said supporting link intermediate said flanges, a pair of side mold sections positioned between said flanges and abutting each other along the length of the part to be cast, said side mold sections having cooperative portions disposed against and intermediate said flanges, said cooperative portions and said cores defining a cavity for said part to be cast, said central member also defining an opening in communication with said cavity through which the molten metal may be poured.

10. A three-piece mold for casting a hollow shank part comprising a central member having a pair of substantially parallel flanges disposed along the length of said part to be cast, a first core integrally formed with said central member and disposed between said flanges, a core supporting link integrally formed with said first core and disposed between said flanges, a second core integrally carried by said link intermediate said flanges, a pair of side mold sections being positioned between said flanges and abutting each other along the length of the part to be cast, said side mold sections having cooperative portions disposed against and intermediate said flanges, said cooperative portions and said cores defining a cavity for said part to be cast, said central member also defining an opening in communication with said cavity through which molten metal may be poured.

References Cited in the file of this patent
UNITED STATES PATENTS 1,897,926    Doelman _____ Feb. 14, 1933